United States Patent
Nagayama (10) Patent No.: US 6,354,948 B1
(45) Date of Patent: Mar. 12, 2002

(54) VIDEO GAME APPARATUS, METHOD OF COMPUTING AMOUNT OF TAKE-UP OF STRING IN VIDEO GAME, AND COMPUTER-READABLE STORAGE MEDIUM STORING PROGRAM FOR COMPUTING AMOUNT OF TAKE-UP OF STRING IN VIDEO GAME

(75) Inventor: Kentaro Nagayama, Osaka (JP)

(73) Assignee: Konami Co., Ltd., Kobe (JP)

( * ) Notice: Subject to any disclaimer, the term of this patent is extended or adjusted under 35 U.S.C. 154(b) by 0 days.

(21) Appl. No.: 09/401,358

(22) Filed: Sep. 21, 1999

(30) Foreign Application Priority Data

Sep. 22, 1998 (JP) .......................................... 10-268501

(51) Int. Cl.7 ........................... A63F 13/00; A63F 9/24; G06F 17/00; G06F 19/00
(52) U.S. Cl. ................................. 463/43; 463/1; 463/7; 463/36; 463/37; 463/38; 463/42; 273/140; 273/148 R; 273/148 B; 273/460; 273/461; 345/156; 345/161; 345/162; 345/184
(58) Field of Search ................................ 463/1, 43, 38, 463/7, 36, 37, 42; 434/247; 273/148 B, 140, 139, 460, 461, 148 R; 345/156, 157, 158, 159, 160, 161, 162, 184

(56) References Cited

U.S. PATENT DOCUMENTS

| | | | | |
|---|---|---|---|---|
| 5,232,223 A | * | 8/1993 | Dornbusch | 463/37 |
| 5,542,672 A | * | 8/1996 | Meredith | 463/37 |
| 5,713,792 A |   | 2/1998 | Ohzono et al. | |
| 5,730,655 A | * | 3/1998 | Meredith | 463/37 |
| 5,897,437 A | * | 4/1999 | Nishiumi et al. | 463/47 |
| D412,016 S | * | 7/1999 | Meredith | D21/329 |
| 5,926,438 A | * | 7/1999 | Saito | 367/111 X |
| D413,359 S | * | 8/1999 | Larian | D21/330 |
| D420,398 S | * | 2/2000 | Fai | D21/329 |
| 6,171,189 B1 | * | 1/2001 | Katano et al. | 463/43 X |

FOREIGN PATENT DOCUMENTS

| | | |
|---|---|---|
| EP | 0916375 | 5/1999 |
| JP | 63 233022 | 9/1988 |

OTHER PUBLICATIONS

Trophy Rivers v.1.0 (Sierra May 8, 1998, p. 1, source: ZDnet).*
Trophy Rivers Filename (Sierra Apr. 28, 1998, p. 1, source: ZDnet).*
Trophy Bass v1.0 (Sierra Aug. 7, 1996, p. 1, source: ZDnet).*
Trophy Bass 2 (Sierra Dec. 13, 1996, p. 1, source: ZDnet).*
"Trophy Rivers" Online!, Jul. 12, 1998, pp. 1–11, XP002136538 Retrieved from the Internet: <URL:WWW.gamestats.com/reviews/software/trophyrivers/trophyriversreview.html> retrieved on 200–04–27! *p. 3, paragraph 3*, *p. 4, paragraph 3* .

* cited by examiner

Primary Examiner—Joe H. Cheng
Assistant Examiner—Binh-An D. Nguyen
(74) Attorney, Agent, or Firm—Jordan and Hamburg LLP (57) ABSTRACT

A video game implementing a fishing game employs a fishing line operated by a fisher character under the control of a game player. A take-up amount computing unit performs a cumulative processing to add a predetermined amount of take-up of the fishing line, each time an operation determining unit determines that the state of a take-up button has been changed from off to on state or that the state of tilt of a stick controller has been changed. Therefore, the fishing line is taken up at a high speed when the take-up button is struck at a high frequency or when the stick controller is rotationally operated at a high speed.

6 Claims, 8 Drawing Sheets

VIDEO GAME APPARATUS, METHOD OF COMPUTING AMOUNT OF TAKE-UP OF STRING IN VIDEO GAME, AND COMPUTER-READABLE STORAGE MEDIUM STORING PROGRAM FOR COMPUTING AMOUNT OF TAKE-UP OF STRING IN VIDEO GAME

BACKGROUND OF THE INVENTION

1. Field of the Invention

The present invention relates to a video game apparatus which employs a storage medium storing program data, such as an optical disk, a magnetic disk, a semiconductor memory or the like, as well as to a method of computing amount of take-up of a string in a video game and also to a computer readable storage medium which stores a string take-up amount computing program for use in a video game.

2. Description of the Related Arts

Hitherto, various types of game systems have been proposed such as a system employing a combination of a home-use exclusive game machine and a television receiver, a business-used exclusive, game machine, and a system employing a combination of a personal computer or a work station, a display unit and a voice output device.

Each of these systems has the following components: a controller to be operated by the player; a storage medium recording a game program data; a CPU which performs various kinds of control for generating sounds and images in accordance with the game program data; a processor for generating images; a processor for generating sounds; a CRT for displaying the images; and a speaker for outputting the sound. CD-ROMs, semiconductor memories, and cassettes incorporating semiconductor memories are major storage mediums used in the game systems of the type described above.

As a kind of video games implemented by these game systems, a fishing game is conceivable which simulates a fishing competition between fisher characters on a simulated fishing site displayed on a game display screen. In such a fishing game, it is necessary to cause a character to perform an action to take up a fishing line by means of a reel.

In order to cause the character to perform a continuous action such as taking up a fishing line by means of a reel, a method is conceivable in which a user continues to press an operation button on a controller so that the character's action is continued as long as the operation button is kept in the pressed state. This method, however, can implement only a monotonous take-up action. In particular, this method cannot express a variety of conditions in the fishing, because the take-up speed is constant, thus failing to provide sufficient fun of the game.

SUMMARY OF THE INVENTION

In view of the foregoing, it is an object of the present invention to provide a video game apparatus in which instruction for causing a character to take up a string is given in a manner to allow a change in the take-up speed, thus enhancing the fun of the game, as well to a method of computing amount of take-up of a string in a video game and also to a computer readable storage medium storing a string take-up amount computing program for use in a video game.

According to one aspect of the present invention, there is provided a video game apparatus in which a character and a string are simulated and displayed on a game display screen, and an instruction is given to cause the character to perform an action to take-up the string, the video game apparatus comprising: operating means externally operable so as to output an operation signal corresponding to a state of operation; operation determining means for determining whether the state of operation of the operating means has been changed; and take-up amount computing means for performing, each time the state of operation is changed, a cumulative processing to add a predetermined amount of take-up of the string.

In accordance with these features, a determination is made as to whether the state of operation of the operating means has been changed by an externally-effected operation, and a cumulative operation is performed to add a predetermined amount of take-up of the string each time the state of operation is changed. Therefore, shorter time interval of the change in the state of operation of the operating means correspondingly increases the speed of take-up of the string. Thus, speed of take-up is changed intentionally in accordance with the rate of operation on the operating means, thus offering a greater fun of the game.

In this video game apparatus, the operating means may comprise a stick-type controller which has an operating stick tiltable in a plurality of directions and which outputs information which is concerned with the state of tilt of the operating stick and which serves as the operation signal; wherein the operation determining means determines whether the state of tilt of the operating stick has been changed; whereby the take-up amount computing means performs-the cumulative processing each time the state of tilt of the operating stick is changed.

With this arrangement, a determination is made as to whether the state of tilt of the operating stick has been changed by an externally-effected operation, and a cumulative operation is performed to add a predetermined amount of take-up of the string each time the state of tilt is changed. Therefore, shorter time interval of the change in the state of tilt of the operating stick correspondingly increases the speed of take-up of the string. Thus, speed of take-up is intentionally controlled in accordance with the rate of the tilting operation of the operating stick, thus offering a greater fun of the game.

The above-described video game apparatus may be arranged such that the operating stick is tiltable in all directions, and such that the operation determining means determines whether the direction of tilt of the operating stick has been changed, whereby the take-up amount computing means performs the cumulative processing in response to each predetermined change in the direction of tilt of the operating stick is changed.

With this arrangement, a determination is made as to whether the direction of tilt of the operating stick has been changed by an externally-effected operation, and a cumulative operation is performed to add a predetermined amount of take-up of the string in response to each predetermined change in the tilting direction. Therefore, shorter time interval of the change in the direction of tilt of the operating stick correspondingly increases the speed of take-up of the string. Thus, speed of take-up is intentionally controlled in accordance with the speed of the rotational operation of the operating stick, thus offering a greater fun of the game. In addition, the reality of the game can be enhanced, since the action for rotational operation of the operating stick resembles an actual action for taking up a string.

The video game apparatus of the present invention may be arranged such that the operating means includes an on-off switch that turns on when pressed from a neutral position by an external pressing force and returns to the neutral position so as to turn off when relieved from the pressing force, and that the operation determining means determines whether the state of the on-off switch has been changed, whereby the take-up amount computing means performs the cumulative processing each time the state of the on-off switch is changed.

With this arrangement, a determination is made as to whether the state of the on-off switch has been changed by an externally-effected operation, and a cumulative operation is performed to add a predetermined amount of take-up of the string upon each predetermined change in the state of the-on-off switch. Therefore, shorter time interval of the change in the state of the on-off switch correspondingly increases the speed of take-up of the string. Thus, speed of take-up is intentionally controlled in accordance with the frequency of striking on the on-off switch, thus offering a greater fun of the game.

The above-described video game apparatus may be arranged such that the operating means further includes a stick-type controller which has an operating stick tiltable in all directions and operable to output information concerning the state of tilt of the operating stick, the information serving as the operation signal, wherein the operation determining mean determines also whether the direction of tilt of the operating stick has been changed, and wherein the take-up amount computing means regards a predetermined change in the tilting direction as being a change in the state of the on-off switch, so as to perform the cumulative processing also in response to each predetermined change in the tilting direction.

With this arrangement, a determination is made as to whether the direction of tilt of the operating stick has been changed by an externally-effected operation, and a cumulative operation is performed to add a predetermined amount of take-up of the string in response to each predetermined change in the tilting direction. Therefore; shorter time interval of the change in the direction of tilt of the operating stick correspondingly increases the speed of take-up of the string. Thus, speed of take-up is intentionally controlled in accordance with the speed of the rotational operation of the operating stick, thus offering a greater fun of the game. In addition, the reality of the game can be enhanced, since the action for rotational operation of the operating stick resembles an actual action for taking up a string. The game player can use either the on-of switch or the stick-type controller as the operating mans, and the cumulative processing for adding a predetermined amount of take up is performed equally regardless of which one of these controlling means is used. Thus, the game player is allowed to select favorite operating means, thus enhancing the variety of the game.

The video game apparatus may further comprise game procedure controlling means which causes the game display screen to display a simulated fishing site and causes the character to perform fishing by using the string as a fishing line, wherein the game procedure controlling means includes: fish hook-on processing means for performing a processing which simulates a state in which a fish has been hooked on the fishing line; hook-on determining means for determining whether the fish has been hooked on the fishing line; and fish-up determining means which determines that the fish has been fished up when the result of the cumulating processing under the hook-on state has reached a predetermined value.

With this arrangement, the game display screen displays a simulated fishing site on which a character performs fishing by using a fishing line which is the string. A processing which simulates a state in which a fish has been hooked on the fishing line is performed, and a determination is made as to whether the fish has been hooked on the fishing line. The cumulative processing for adding a predetermined amount of take-up of the string is performed each time the state of operation of the operating means is changed, while the fish has been hooked on the fishing line. It is determined that the fish has been fished up when the result of the cumulating processing under the hook-on state has reached a predetermined value. Therefore, the speed of take-up of the fishing line is controlled by the rate of operation of the operating means performed by the game player, whereby the fishing game can be adequately implemented.

The game procedure controlling means may include a fish controlling means for controlling the direction of movement of the fish hooked on the fishing line, and such that the take-up amount computing means changes the predetermined amount of take-up in accordance with the direction of movement of the fish.

With this arrangement, the direction of movement of the fish hooked on the fishing line is controlled, and the predetermined amount of take-up is changed in accordance with the direction of movement of the fish. Consequently, the speed of take-up of the fishing line varies in accordance with the direction of movement of the fish, whereby the dynamic feel of pulling on the fishing line by the fish can be expressed.

In accordance with another aspect of the present invention, there is provided a method of computing amount of take-up of a string in a video game in which a character and the string are simulated and displayed on a game display screen, and an instruction is given to said character to cause said character to perform an action to take-up said string, said method comprising: determining whether a state of operation on an operating means, which is externally operable and which produces an operation signal in accordance with the state of the externally effected operation, has been changed; and performing a cumulative processing to add a predetermined amount of take-up of said string upon each change of the state of operation.

According to this method, a determination is made as to whether a state of operation on an operating means which is externally operable and which produces an operation signal in accordance with the state of the externally effected operation has been changed. Then, a cumulative processing is performed to add a predetermined amount of take-up of the string, each time the state of operation is changed. Therefore, shorter interval of the change in the state of operation of the operating means correspondingly increases the speed of take-up of the string. Consequently, the speed of take-up of the string can be intentionally controlled by varying the rate of operation of the operating means, whereby the fun of the game is enhanced.

According to still another aspect of the present invention, there is provided a computer-readable storage medium storing a string take-up amount computing program in a video game in which a character and the string are simulated and displayed on a game display screen, and an instruction is given to the character to cause the character to perform an action to take-up the string, the program comprising: a determining step for determining whether a state of operation on an operating means which is externally operable and which produces an operation signal in accordance with the state of the externally effected operation has been changed; and a computing step for performing a cumulative processing to add a predetermined amount of take-up of the string upon each change of the state of-operation.

When this storage medium is loaded on a computer, the computer reads and executes the program. Thus, a determination is made as to whether a state of operation on an operating means which is externally operable and which produces an operation signal in accordance with the state of the externally effected operation has been changed. Then, a computing step is executed for performing a cumulative processing to add a predetermined amount of take-up of the string upon each change of the state of operation. Therefore, shorter interval of the change in the state of operation of the operating means correspondingly increases the speed of take-up of the string. Consequently, the speed of take-up of the string can be intentionally controlled by varying the rate of operation of the operating means, whereby the fun of the game is enhanced.

These and other objects, features and advantages of the present invention will become clear from the following description of the preferred embodiment when the same is read in conjunction with the accompanying drawings.

DESCRIPTION OF THE PREFERRED EMBODIMENT

Figure 1:
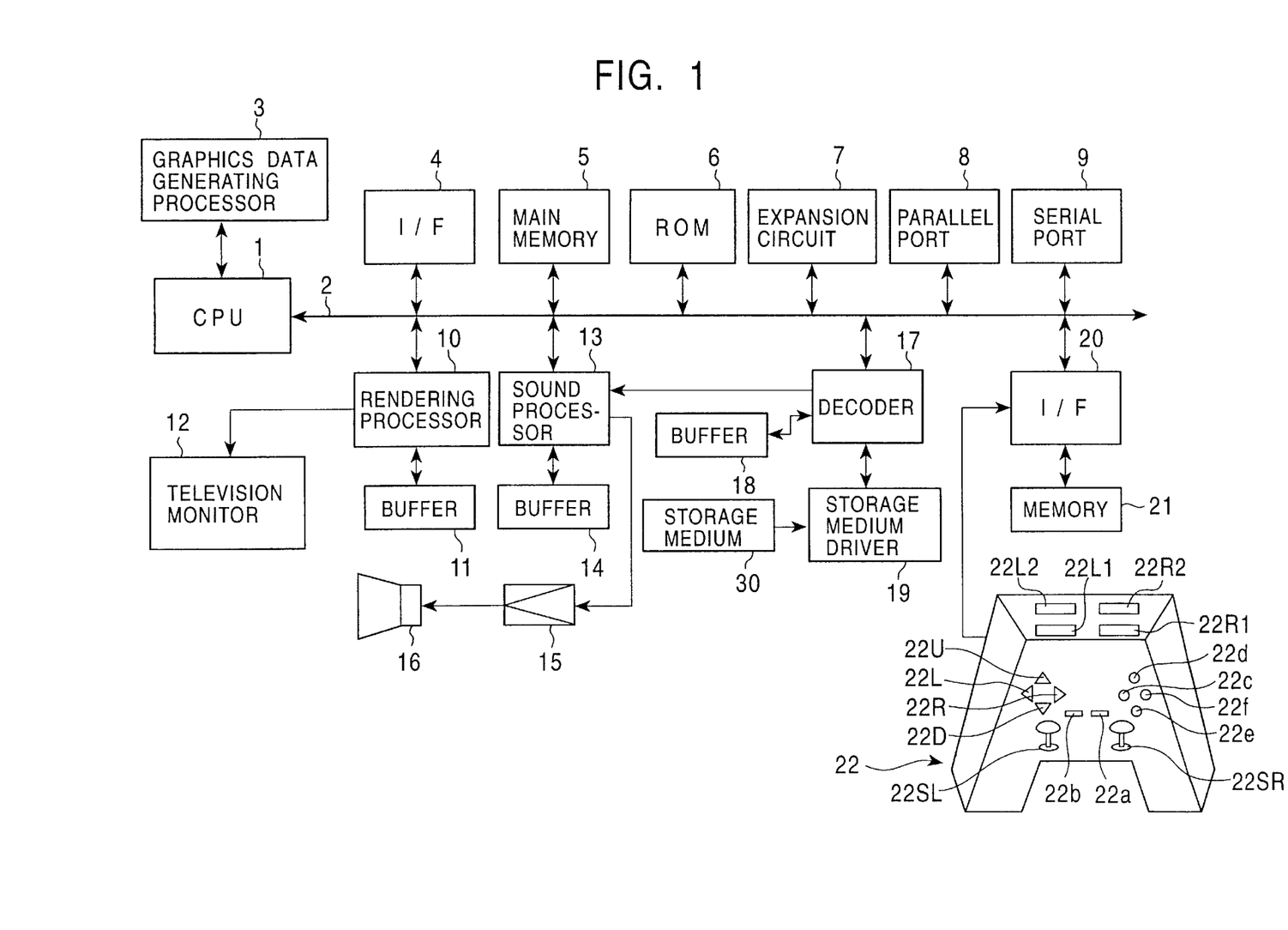
FIG. 1 is a block diagram of a game system as an embodiment of the present invention.

FIG. 1 is a block diagram showing the construction of a game system as an embodiment of the present invention. The game system has a game machine main unit and a storage medium 30 storing program data. The main unit includes a CPU 1, a BUS 2 connected to the CPU-1 and including an address BUS, a data BUS and a control BUS, a graphics data generating processor 3, and various components connected to the BUS 2.

The components connected to the BUS 2 includes an interface circuit 4, a main memory 5 having, for example, a RAM, a ROM 6, an expansion circuit 7, a parallel port 8, a serial port 9, a combination of a rendering processor 10 and a buffer 11, a combination of a sound processor 13 and a buffer 14, a combination of a decoder 17 and a buffer 18, and a combination of an interface circuit 20 and a memory 21.

To the rendering processor 10 is connected to a television monitor (referred to simply as a "monitor", hereinafter) 12 which serves as displaying means. A speaker 16 is connected to the sound processor 13 through an amplifier circuit 15. A storage medium 19 driver is connected to the decoder 17. A memory 21 and a controller 22 are connected to the interface circuit 20.

The arrangement of the above-described game system varies according to the use. For instance, when the above-described game system is intended for home use, the monitor 12 and the speaker 16 are separately provided.

In contrast, when the game system is arranged as a business game system, all the devices and components shown in FIG. 1 are consolidated and mounted in a common housing.

When the above-described game system is constructed on a core machine such as a personal computer or a work station, the monitor 12 can be implemented by the computer display, while the rendering processor 10, sound processor 13 and the expansion circuit 7 are implemented by part of program data stored in the storage medium 30 or by hardware on an extension board which is loaded in an extension slot of the computer. Likewise, the interface circuit 4, parallel port 8, serial port 9 and the interface circuit 20 are implemented by hardware on an extension board which is loaded in an extension slot of the computer. Buffers 11, 14 and 18 are presented by the main memory 5 or by storage areas in an extension memory which is not shown.

The embodiment, arranged as a home-use game system will be described by way of example.

A description will now be given of each of the devices and components shown in FIG. 1.

The graphics data generating processor 3 functions as a co-processor which co-operates with the CPU 1. More specifically, the graphics data generating processor 3 performs parallel processings to execute computations such as coordinate transformation, light source calculation, and computation of fixed-decimal-point matrix and vectors. The main task of the graphics data generating processor 3 is to determine addresses of points on an image under processing, based on data supplied by the CPU 1, such as coordinate data, translation amount data and rotation amount data on polygon apices in two- or three-dimensional plane, and to deliver the address data back to the CPU 1. It is also one of the main tasks of the graphics data generating processor 3 to calculate luminance of the display screen in accordance with the distance from an imaginary light source.

The interface circuit 4 provides an interface for connection to peripheral devices such as a pointing device, e.g., a mouse, a tack ball or the like. The ROM 6 stores a program data which implements an operating system of the game system. In case of a personal computer, the ROM 6 is constituted by, for example, a BIOS (Basic Input Output System).

The expansion circuit 7 performs expansion or decompression of an that has been compressed by intra-coding which follows, in the case of a moving picture, MPEG (Moving Picture Engineering Group) and JPEG (Joint Picture Engineering Group) in case of a still image. The expansion processing includes decoding processing (decoding of data that has been encoded by VLC: Variable Length Code), inverse quantization, IDCT (Inverse Discrete Cosine Transform) processing, restoration of an intra-image, and so forth.

The rendering processor 10 executes rendering processing on the buffer 11, in accordance with rendering instructions given by the CPU 1.

The buffer 11 is constituted by, for example, a RAM and has a display area (frame buffer) and a non-display area. The display area is an area in which data to be displayed on the display screen of the monitor 12 is developed.

In the illustrated embodiment, the non-display area stores various kinds of data such as data defining skeletons, model data defining polygons, animation data which implements motions of a mode, and pattern data showing the contents of the animation pictures, as well as texture data, color pallet data, and so forth.

The texture data are two-dimensional image data, while the color pallet data are data that designate colors of the texture data. These data are copied to the non-display area of the buffer 11 from the storage medium 30 at once or in a plurality of times in accordance with the progress of the game, under the control of the CPU 1.

There are two types of rendering instructions: namely, rendering instructions for rendering three-dimensional images by using polygons and rendering instructions for forming ordinary two-dimensional images. The polygons are polygonal-shaped two-dimensional imaginary patterns. The illustrated embodiment employs triangular or quadrilateral patterns.

The rendering instruction for rendering a three-dimensional image by means of polygons include: polygon apices address data indicating addresses of polygon apices on the display area of the buffer 11, texture address data indicating the addresses on the buffer 11 where the texture data to be pasted to polygons are stored, color pallet address data indicating the addresses on the buffer 11 where the color pallet data designating the colors of the texture data are stored, and luminance data indicating the luminance of the texture.

Among these data, the polygon apices address data on the display area are two-dimensional polygon apices coordinate data generated through a coordinate transformation from coordinate data which represent coordinates of apices of a polygon in a three-dimensional space and which are received from the CPU 1, the transformation being performed by the graphics data generating processor 3 based on the translation amount data and rotation amount data of the display screen itself. The luminance data also is generated by the graphics data generating processor 3, based on the position indicated by the polygon apices coordinate data which have been obtained through the above-described coordinate transformation and which are given by the CPU 1, in accordance with the distance from the imaginary light source.

The polygon apices address data indicates the addresses on the display area of the buffer 11. The rendering processor 10 writes texture data corresponding to a polygon in a region of the display area of the buffer 11 defined by three or four pieces of polygon apices address data.

One object is constituted by a number of polygons. The CPU 1 operates such that the coordinate data of each polygon in the three-dimensional space is stored in the buffer 11 in relation-to the corresponding skeleton vector data. The CPU 1 performs the following processings when the character is to be moved on the display screen, i.e., when the controller 22 is operated so as to move the character itself or to move a viewing point from which the character is viewed.

Namely, the CPU 1 supplies the graphics data generating processor 3 with the three-dimensional coordinate data of each polygon that have been stored in the non-display area of the buffer 11 and also with translation amount data and rotation amount data for each polygon, determined based on the coordinates of the skeleton and the rotation amount data of the skeleton.

Based on the polygon apices three-dimensional coordinate data and the polygon translation amount and rotation amount data thus supplied, the graphics data generating processor 3 sequentially determines the three-dimensional coordinate data of the polygon after the translational movement and the three-dimensional coordinate data of the polygon after the rotation.

Among the three-dimensional coordinate data on each polygon thus determined, the horizontal and vertical coordinate data are supplied to the rendering processor 10, so as to be used as the address data on the display area of the buffer 11, i.e., as the polygon apices address data.

The rendering processor 10 writes, in triangular or quadrilateral areas on the buffer 11 defined by the three or four pieces of polygon apices data, the texture data that have been allocated to the respective polygons. Consequently, the display screen of the monitor 12 displays an object constituted by a number of polygons to which texture data have been pasted.

The rendering instruction for forming an ordinary two-dimensional image contains apices address data, texture address data, color pallet address data indicating positions on the buffer 11 where the color pallet data designating texture data colors are stored, and a texture luminance data indicative of the luminance of the texture. Among these data, the apices address data are coordinate data that are obtained through a coordinate transformation performed by the graphics data generating processor 3 on the two-dimensional apices coordinate data derived from the CPU 1, based on the translation amount data and the rotation amount data which also are received from the CPU 1.

The sound processor 13 writes the ADPCM data read from the storage medium 30 into the buffer 14. The ADPCM data stored in the buffer 14 are used as the source of sounds. The sound processor 13 reads the ADPCM data in accordance with a clock of, for example, 44.1 kHz.

The sound processor 13 effects various processings on the ADPCM data read from the buffer 14, such as a change of the pitch, addition of noise, setting of envelope, setting of sound level, addition of reverb, and so forth.

When the sound data read from the storage medium 30 is PCM data such as CD-DA (Compact Disk Digital Audio) data, the sound data is converted into ADPCM data by means of the sound processor 13.

The processing effected on the PCM data in accordance with the program data is executed directly on the main memory 5. The PCM data processed on the main memory 5 is supplied to the sound processor 13 and converted by the sound processor 13 into the ADPCM data. The ADPCM data thus obtained are subjected to the above-described processings and then output as sounds from the speaker 16.

The storage medium driver 19 may be any one of a CD-ROM driver, a hard disk drive, an optical disk drive, a flexible disk drive, a silicon disk drive, a cassette medium reader, and so forth.

The storage medium 30 may be any one of a CD-ROM, hard disk, optical disk, flexible disk, semiconductor memory, and so forth.

The storage medium driver 19 reads data such as image data, sound data and program data from the storage medium 30, and supplies the read data to the decoder 17. The decoder 17 effects an error correction processing by means of ECC (Error Correction Code) on the reproduced data derived from the storage medium driver 19, and delivers the error-corrected data to the main memory 5 or to the sound processor 13.

The memory 21 has a holder and a card-type memory. The card-type memory is used to hold various parameters of the game, e.g., to hold the state obtained when the game is finished.

The controller 22 includes the following parts which serve as externally-operable operating means: a first left button 22L1, a second left button 22L2, a first right button 22R1, a second right button 22R2, an upward key 22U, a downward key 22D, a leftward key 22L, a rightward button 22R, a start button 22a, a select button 22b, a first button 22c, a second button 22d, a third button 22e, a fourth button 22f, a left stick 22SL and a right stick 22SR. The controller 22 delivers various operation signals to the CPU 1 in accordance with the operation performed by the game player.

The upward key 22U, downward key 22D, leftward key 22L and the rightward key 22R enable the game player to deliver to the CPU 1 various commands for moving, for example, a character or a cursor up and down and to the left and right on the display screen of the monitor 12.

The start button 22a enables the game player to give to the CPU 1 an instruction to start the game program data loaded from the storage medium 30. The select button 22b is used by the game player to give to the CPU various selections concerning the game program data to be loaded from the storage medium into the main memory 5.

The buttons and keys on the controller 22, except for the left stick 22 SL and the right stick 22SR, are on-off switches of the type which is turned on when pressed down from a neutral position by an external force and turned off by being reset to the neutral position when relieved from the pressing external force.

The left stick 22SL and the right stick 22SR are stick-type controllers having a construction substantially the same as that of a so-called joystick. More specifically, each of the left and right sticks 22SL, 22SR includes an upright stick which is tiltable about a fulcrum in all directions including back and forth and left and right directions. A coordinate system is set up having x- and y-axes intersecting at the origin constituted by the neutral upright position of the stick. When the stick is tilted, an x-coordinate value indicative of a position in the left and right directions and a y-coordinate value indicative of a position in the forth and back directions are generated in accordance with the direction and angle,of the tilt, and are delivered as an operation signal to the CPU 1, via the interface circuits 15 and 10. A detailed description will be given later in connection with the operation signal.

The functions allocated to the first left button 22L1, second left button 22L2, first right button 22R1 and the second right button 22R2 vary according to the kind of the game program data loaded from the storage medium 30.

A description will be given of the outline of the operation of this game system.

The game system is supplied with electrical power when a power switch (not shown) is turned on. If the storage medium 30 has been loaded on the storage medium driver 19, the CPU 1 operates in accordance with the operating system stored in the ROM 16, so as to give an instruction to the storage medium driver 19 to cause the driver 19 to read program data from the storage medium 30. In response to the instruction, the storage medium driver 19 reads image data, sound data an program data from the storage medium 30.

The image data, sound data an program data read from the storage medium 30 are supplied to the decoder 17 which performs error correction on these data. The image data after the error correction performed by the decoder 17 is supplied to the expansion circuit 7 via the BUS 2, so as to undergo the aforesaid processings performed by the expansion circuit 7. The image data thus processed is supplied to the rendering processor 10 which in turn writes the image data into the non-display area of the buffer 11.

The sound data after the error correction performed by the decoder 17 is supplied to the main memory 5 or to the sound processor 13, and is written in the main memory 5 or in the buffer 14.

The program data after the error correction performed by the decoder 17 is supplied to and written in the main memory 5. Thereafter, the CPU 1 proceeds with the game based on the game program data stored in the main memory 5 and contents of instructions given by the game player through the controller 22. Namely, the CPU performs control of processings such as the image processing operation, sound processing operation an other internal processings, in accordance with the contents of the instructions given by the user through the controller 22.

In this embodiment, the control of image processing operation includes the following operations: computation of coordinates of skeletons and computation of polygon apices coordinate data based on pattern data which corresponds to animation representing the action instruction given to each character; delivery of the thus-obtained three-dimensional coordinate data and viewing point data to the graphics data generating processor 3; and production of rendering instructions including the address data on the display area of the buffer, as well as the luminance data, determined by the graphics data generating processor 3.

The control of the sound processing includes issuance of sound-output commands to the sound processor 13, designation of the sound level and reverb, and so forth. The control of internal processings includes computations performed in accordance with the operation input given through the controller 22.

Figure 2:
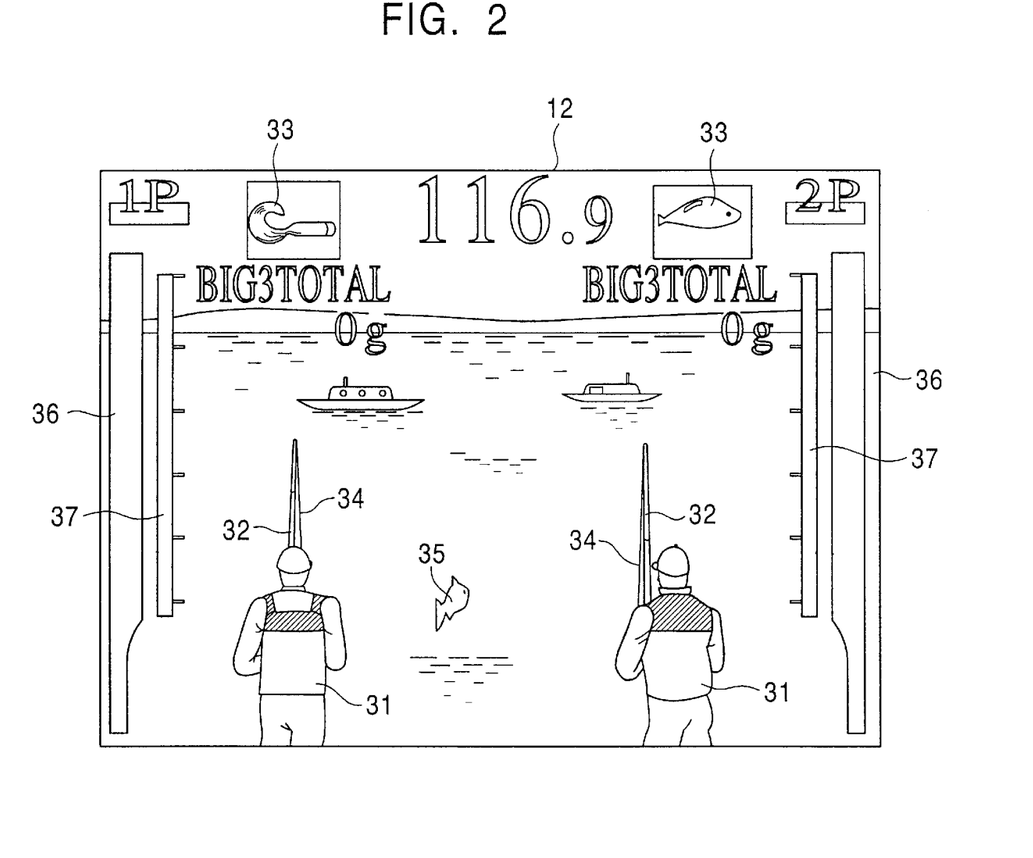
FIG. 2 is an illustration of a game display screen.

A description will now be given of a video game which is implemented by the described game system, with reference to FIG. 2 which shows a display screen which is displayed when the game proceeds.

The video game which will now be described is a lure fishing game in which the scenery of a fishing site such as a lake is displayed on the monitor 12, wherein a fisher character 31 casts a lure 34 by swinging a fishing rod 32, and takes up the fishing line (string) 34 to which the lure 33 is connected, thereby to fish up, land, a fish 35 that has been hooked by the lure. Although a game display screen is shown for a mode in which two game players participate in the game, a game mode is available which proceeds with a single game player.

The time available until expiration of a time limit for the game is shown at the center of an uppermost region of the display screen on the monitor 12, while configurations of lures 33 under the use, selected from various predetermined lure configurations, are displayed on both lateral sides of the time display region. The "BIG 3 TOTAL" indicated below each lure configuration shows the total weight of three heaviest fishes selected from among the fishes fished-up by each fisher character. On each of the left and right ends of the display screen, there are shown a tension gauge 36 indicating the tension applied to the fishing line 34 by the fish 35 hooked on and moving to and from, and a lure depth gauge 37 indicating the depth of the lure from the level of the water surface.

The game condition is set such that the hooked fish 35 is freed or the fishing line 34 is cut when a tension indicator reaches (or approaches) an upper limit on the tension gauge 36.

Figure 3:
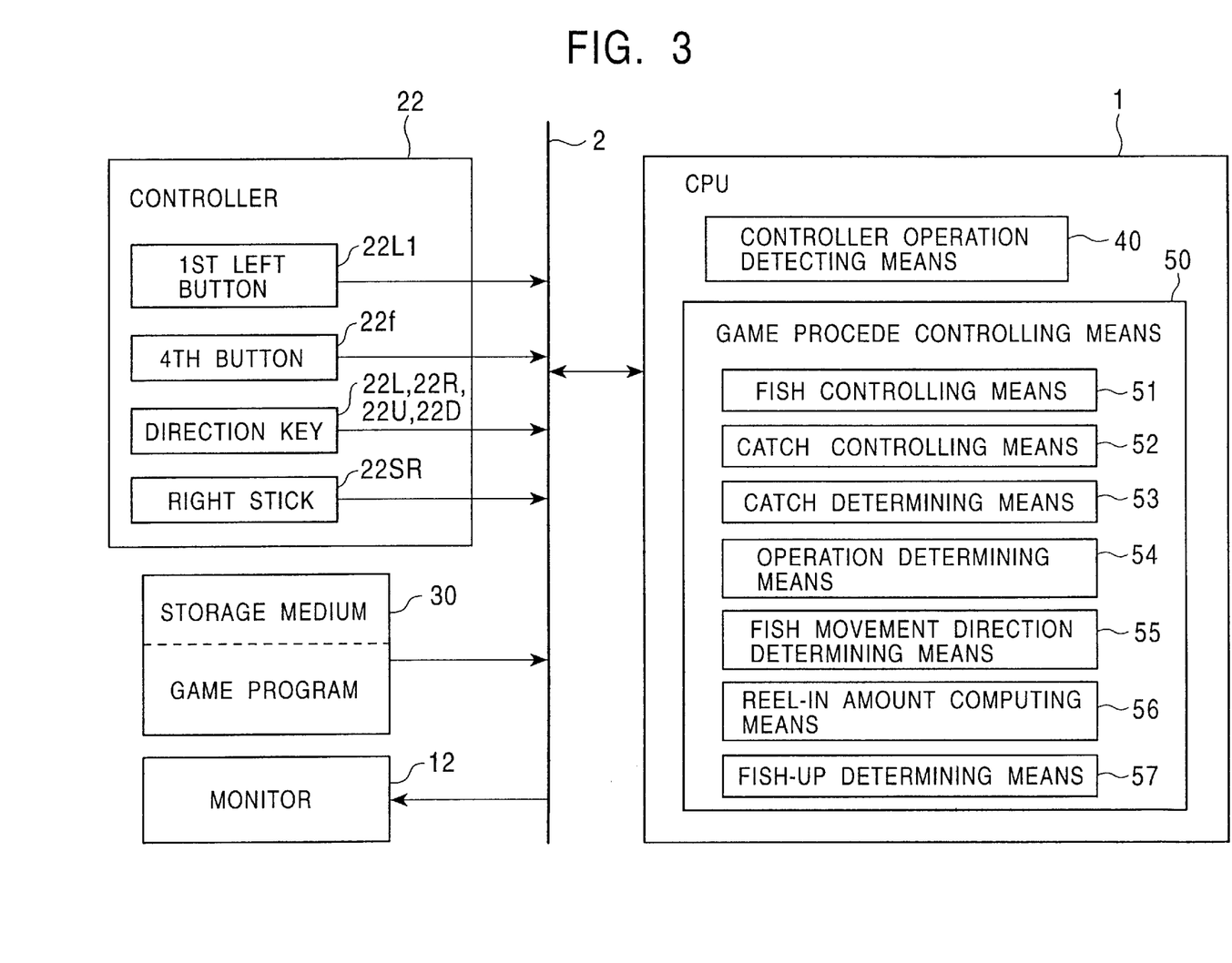
FIG. 3 is a block diagram showing function blocks of the CPU and major blocks of the system shown in FIG. 1.
Figure 4:
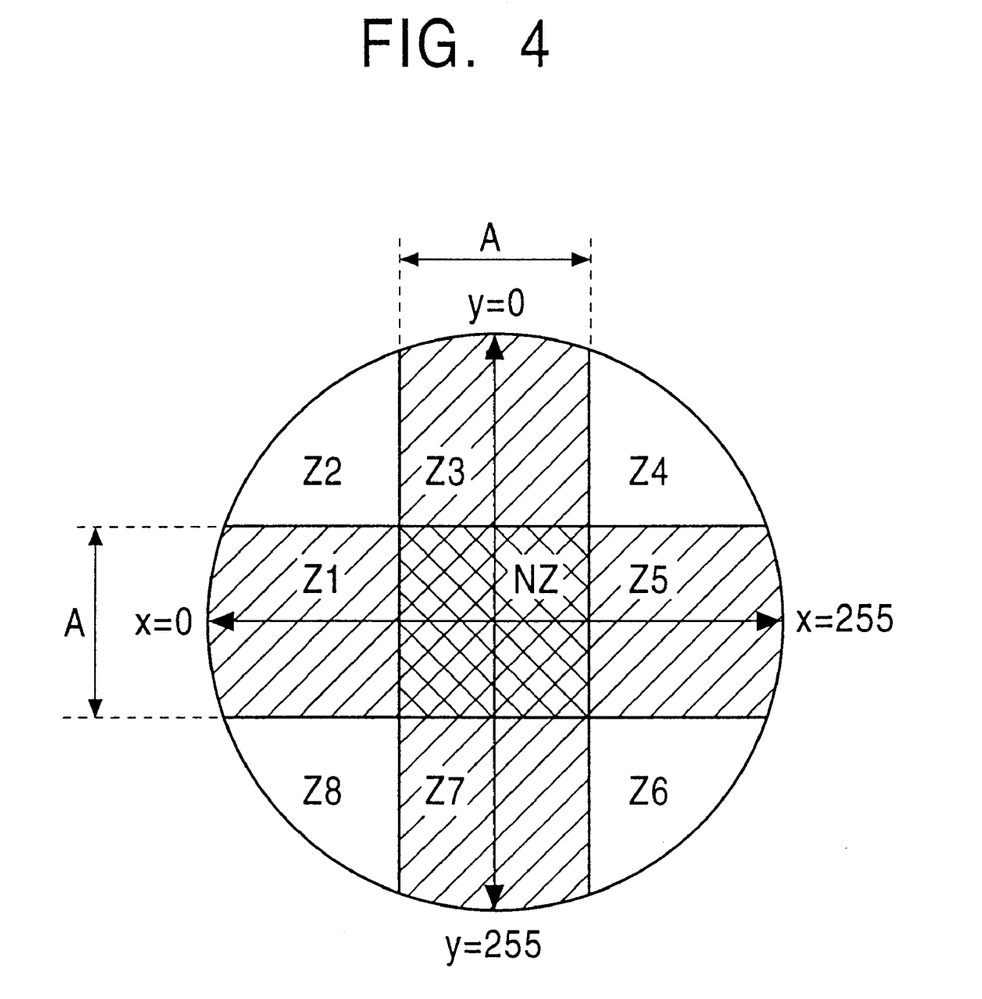
FIG. 4 is an illustration of a tilting operation of a right stick.

FIG. 3 is a diagram showing function blocks of the CPU 1, as well as blocks constituting a major part of the game system shown in FIG. 1. FIG. 4 is an illustration of operation signals which are produced as a result of tilting of the left and right sticks 22SL and 22SR.

Referring to FIG. 3, the CPU 1 has a controller operation detecting means 40 and a game procedure controlling means 50 which are function blocks. The controller operation detecting means 40 detects the state of operation of the controller 22 based on the operation signal output from the controller 22.

The game procedure controlling means 50 controls various devices and components of the system shown in FIG. 1, based on the state of operations effected on the controller 22 as detected by the controller operation detecting means 40 and on the game program stored in the storage medium 30. For instance, the game procedure controlling means 50 has the following functions.

(1) Functions to change the direction in which the fishing rod 32 is directed in accordance with operations on the direction keys 22L, 22R, 22U and 22D.
(2) A function to control, when the fish 35 has been hooked on by the lure 33, the display of the tension gauge 36 based on the result of determination of the tension applied by the fish 35 on the fishing line 34, wherein the tension is determined based on the direction of movement of the fish 35 determined by the game program and the amount of reel-up of the fishing line 34 which will be described later.
(3) A function to determine, based on the amount of reel-up of the fishing line 34 and the direction of the fishing rod 32, the depth of the lure 33 from the level of the water surface and to display the depth on the lure depth gauge 37 in accordance with the result of the determination.

The game procedure controlling means 50 has the following function blocks: a fish controlling means 51, a hook-on processing means 52, a fish-on determining means, an operation determining means 54, a fish direction determining means 55, a take-up amount computing means 56, and fish-up determining means 57.

The fish controlling means 51 controls the direction of movement of the fish in accordance with the game program derived from the storage medium 30. The fish-on processing means 52 conducts, based on the state of operation on the controller 22 and the game program, a processing for implementing a state in which a fish 35 is hooked on a lure 33 (or fishing line 34). The fish-on determining means 53 that the fish 35 has been hooked on the lure 33.

The operation determining means 54 determines whether any change has occurred in the state of operation on the operating means, and has the following functions.

(1) a function to determine, based on the result of the detection performed by the controller operation detecting means 40, whether the state of operation of the take-up button (fourth button 22f in the illustrated embodiment) has been changed from off state to on state.
(2) a function to determine, based on the result of the detection performed by the controller operation detecting means 40, whether the state of tilt of the right stick 22SR of the controller has been changed and to regard, upon determining that a change has occurred, that the state of the take-up button has been changed from off state to on state.

A description will be given of the above-mentioned function ( ).

As shown in FIG. 4, the operation signal given by the controller 22 delivers to the CPU 1 in response to a tilting operation of the right stick 22SR is expressed in terms of coordinate data (x, y) as follows:.

Leftward tilting to the maximum angle: x=0
Rightward tilting to the maximum angle: x=255
Upward tilting to the maximum angle: y=0
Downward tilting to the maximum angle: y=255

When no tilting operation has been effected, the stick is held in the neutral position which is expressed by the coordinate data (x, y)=(128, 128). The operation determining means 54, however, sets a predetermined neutral zone NZ by giving an insensitive length A (A being 48 in the illustrated embodiment) both along the "x" and "y" axes in both directions starting from the neutral position (128, 128), as shown in FIG. 4, by taking into account a play of the stick around the neutral position. Thus, when the coordinates (x, y) fall within the neutral zone, the operation determining means 54 determines that no tilting has been effected.

As shown in FIG. 4, the range outside the neutral zone NZ is divided into eight sub-zones Z1 to Z8. The operation determining means 54 picks up the coordinates (x, y) at a predetermined sampling period (in the illustrated embodiment, the sampling period is ¹⁄₆₀ second). When the coordinates (x, y) have changed from one to another sub-zone between the sampling periods, the operation determining means 54 determines that the state of tilt has been changed, whereas, when the coordinates (x, y) remain in the same sub-zone, the operation determining means determines that there is no change in the state of tilt. Further, the operation determining means 54 regards the state of the take-up button as having been changed from off state to on state, upon determining that the state of tilt has been changed.

Referring back to FIG. 3, the fish direction determining means 55 determines whether the direction of movement of the fish 35 under the control of the fish controlling means is a direction which tenses the fishing line 34.

The take-up amount computing means 56 performs a cumulative computation to add up the amount of take-up of the fishing line 34, and has the following functions.

(1) A function to perform a cumulative processing to add a predetermined amount of take-up of the fishing line, each time the operation determining means has determined that the state of the take-up button (fourth button 22f in the illustrated embodiment) has been changed from off to on or each time the operation determining means 54 regards that the state of the take-up button has been changed from off to on as a result of a change in the state of tilt of the right stick 22SR. Therefore, the fishing line 34 is quickly taken up when the fourth button 22f is pressed repeatedly at short interval or when the right stick 22SR is rotationally operated at a high speed.

A function to slack the fishing line 34 in the period over which the controller operation detecting means 40 is in detection of a release button (for instance, first left button 22L1 in the illustrated embodiment) in an on state. Thus, the cumulative value of the take-up amount of the fishing line 34 decreases when the fish 35 moves "away".

A function to reduce the cumulative value of the take-up amount when the fish direction determining means 55 has determined that the fish 35 is moving in the direction to tense the fishing line 34. Therefore, the speed of take-up of the fishing line 34 is reduced when the fishing line is tensed by the fish, even in response to the same take-up operation, thus providing a dynamic feel of a fight with the fish 35.

The fish-up determining means 57 determines that the fish 35 has been fished up, when the cumulative value of the take-up amount of the fishing line 34 computed by the take-up amount computing means 56 has reached a predetermined value.

The procedure of the illustrated lure fishing game will be described with reference to a flowchart shown in FIG. 5, focusing mainly on the operation for taking up the fishing line 34.

In response to turning on of the start button 22a, the game is started to enable setting of initial conditions such as selection of the lake as the fishing site, selection of the lure to be used, and so forth (Step ST10).

Then, the direction and reach of the casting are determined (answer "YES" in Step ST20), and casting is performed (Step ST30).

Then, whether a new operation of the take-up button (for instance, the fourth button 22f in the illustrated embodiment) from off state to on state has been effected (Step ST40). If no operation has been performed (answer "NO" in Step ST40), the process advances to Step ST60, whereas, if an operation has been performed ("YES" in Step ST40), the fishing line 34 is taken up by a predetermined amount (Step ST50). Then, determination is made as to whether the fish 35 has been hooked on the lure 33 (Step ST60). If the fish has not been hooked (answer "NO" in Step ST60), the process returns to Step ST40.

Conversely, if the fish 35 has been hooked on the lure 33 (answer "YES" in Step ST60), a determination is made as to whether the take-up button has been operated (Step ST70). If the take-up button has not been operated (answer "NO" in Step ST70), the process advances to Step ST100, whereas, if the take-up button has been operated (answer "YES" in Step ST70), the direction of movement of the fish is determined (Step ST80), and the fishing line 34 is taken up by an amount corresponding to the result of the determination of the moving direction (Step ST90). Thus, the fishing line is taken up by the predetermined amount if the fish 35 is not applying tension, whereas, if the fish 35 is applying a tension, the amount of take-up is reduced accordingly from the predetermined amount.

Then, a determination is made as to whether the release button (for instance, the first left button 22L1 in the illustrated embodiment) has been turned on (Step ST100). If the release button has not been turned on (answer "NO" in Step ST100), the process advances to Step ST120, whereas, of the release button has been turned on (answer "YES" in Step ST100), the fishing line 34 is slacked in accordance with the movement of the fish 35 (Step ST110).

Then, a determination is made as to whether the fish 35 has been fished up., i.e., whether the fishing line 34 has been fully taken up (Step ST120). If the fish 35 has not yet been fished up (answer "NO" in Step ST120), a determination is made as to whether the time is over due to expiration of the given time (Step ST130). If the time is not over (answer "NO" in Step ST130), the process returns to Step ST70, whereas, if the time is over (answer "YES" is given in Step ST130), this terminating the game.

Conversely, of the fish 35 has been fished up (answer "YES" in Step ST120), a processing is performed to measure the weight of the fish 35 (Step ST140), followed y determination as to whether the tie is over due to expiration of the given time (Step ST150). If the time is not over (answer "NO" in Step ST150), the process returns to Step ST20 to repeat the steps described heretofore, whereas, if the time is over (answer "YES" in Step ST150), the game if finished.

It will be seen that the fishing line 34 is taken up by a predetermined amount each time a new operation of the take-up button from off to on state is detected, through the execution of Steps ST70 to ST90.

Figure 6:
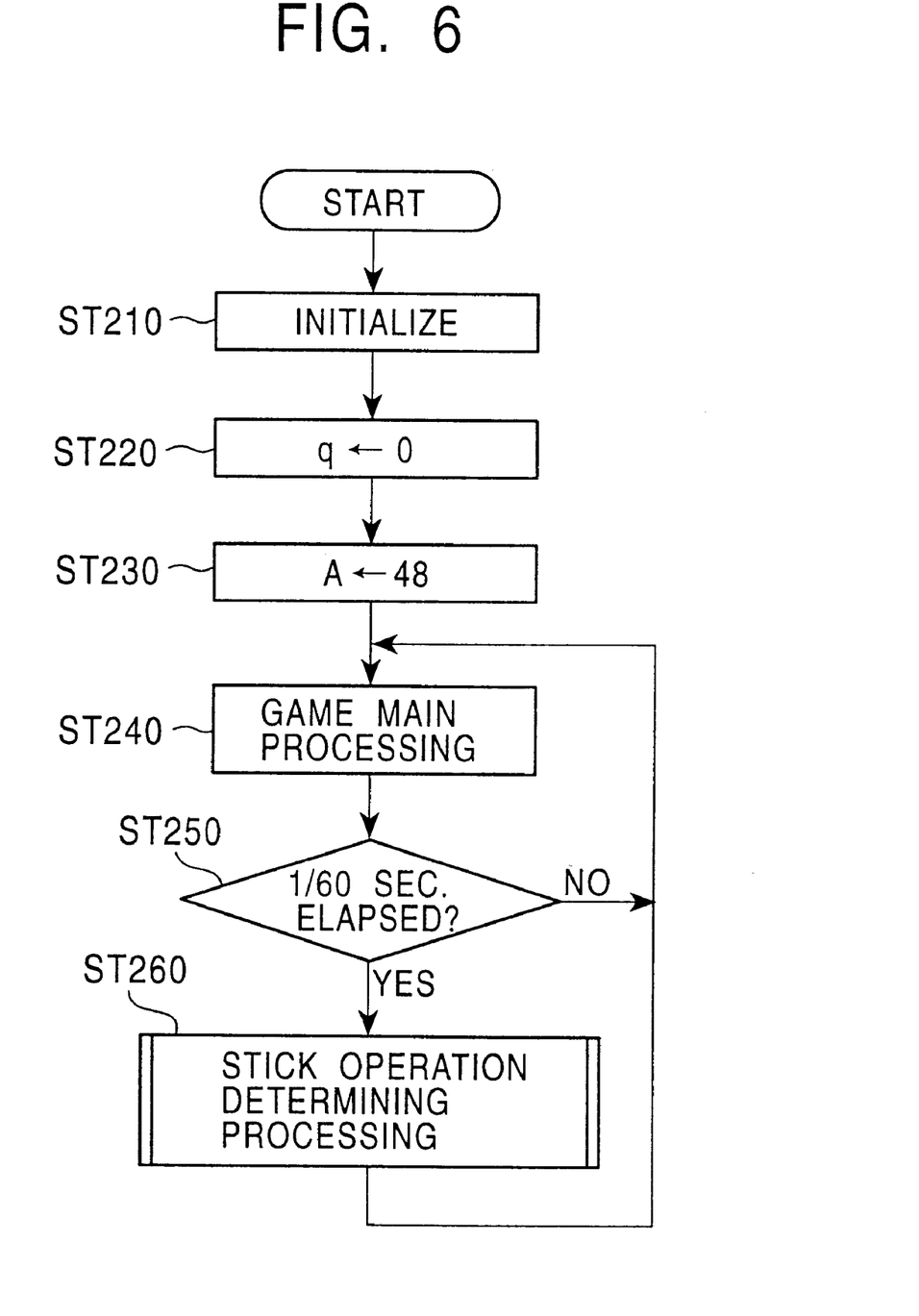
FIG. 6 is a flowchart showing a main routine of a game program stored in a storage medium.
Figure 7:
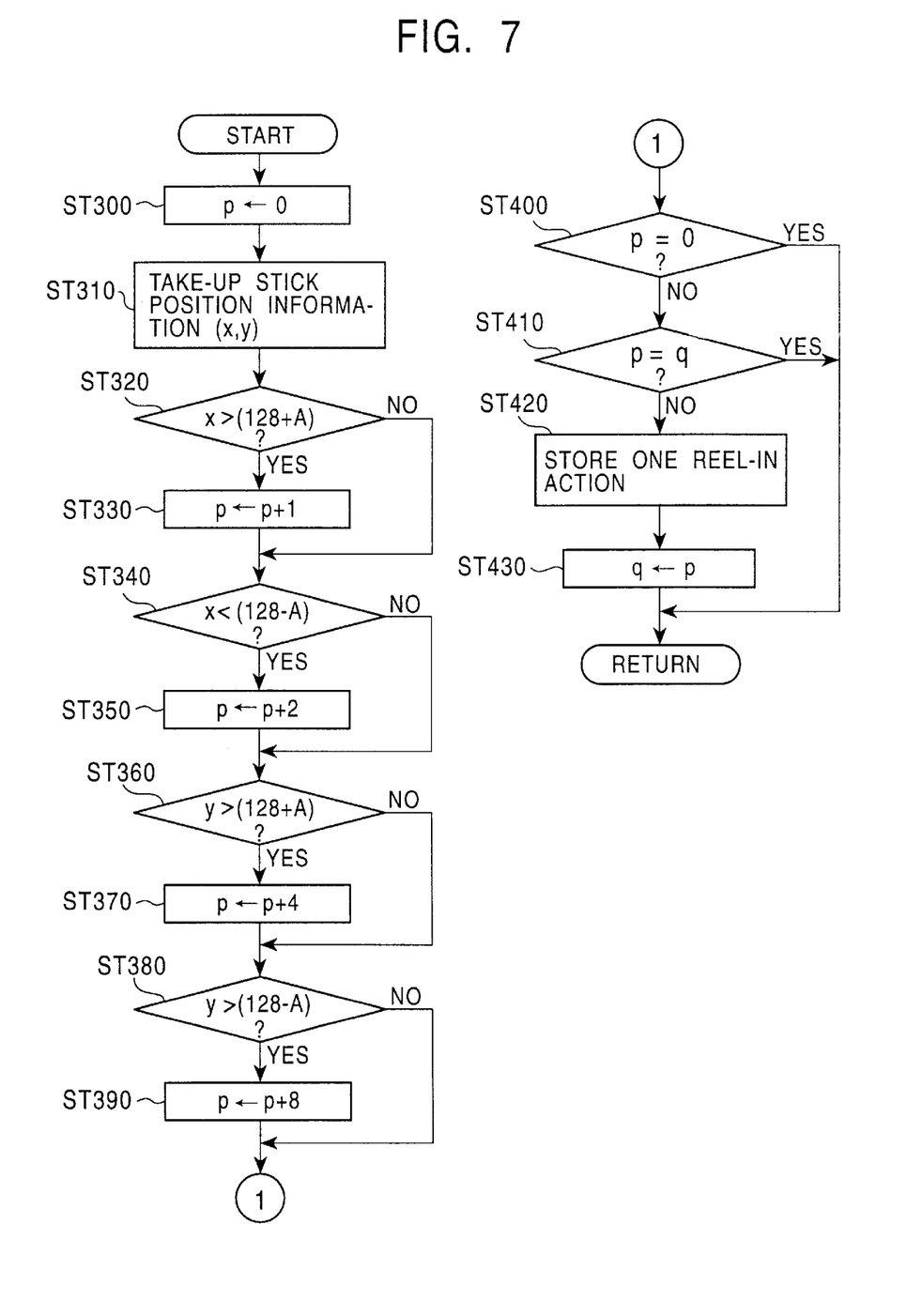
FIG. 7 is a flowchart illustrative of the procedure of a stick operation determining processing sub-routine.
Figure 8:
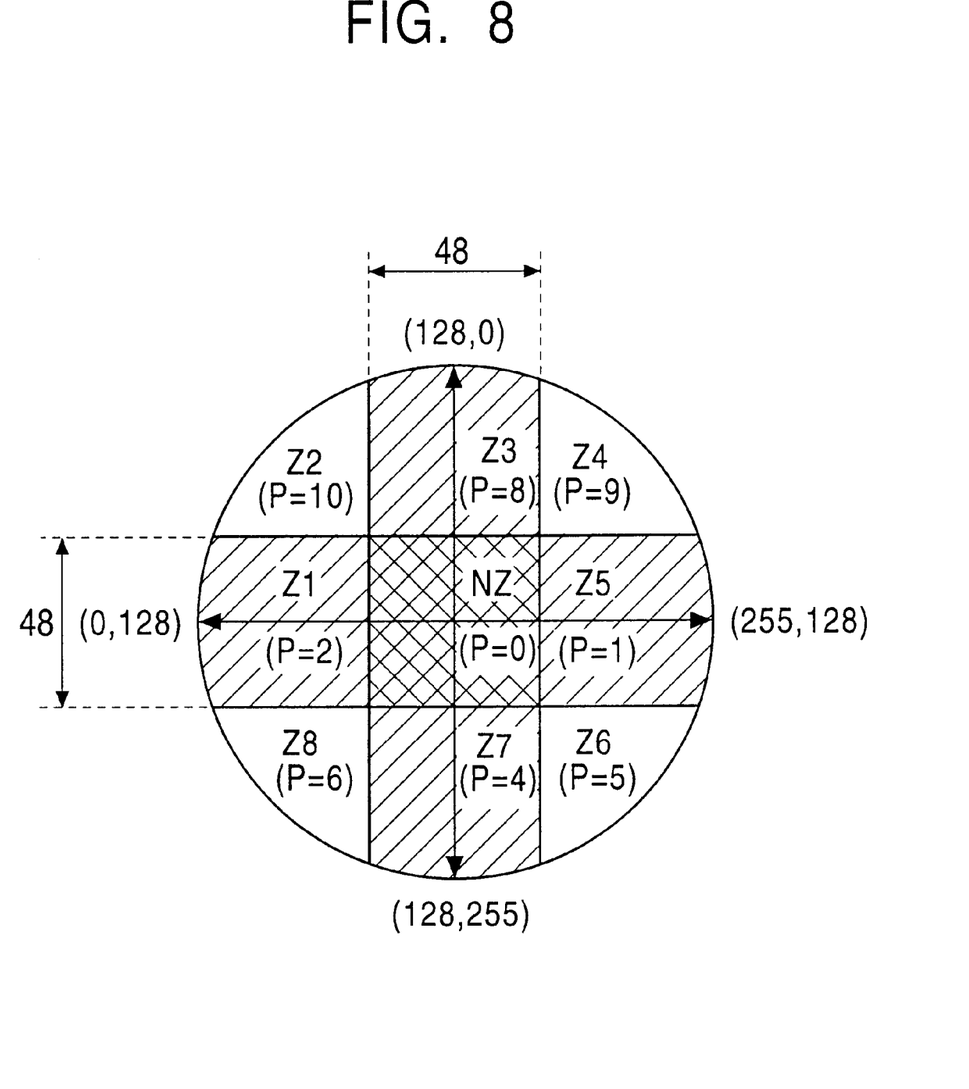
FIG. 8 is an illustration of a determination as to a change in the state of tilt of the right stick.

A description will now be given of the procedure of the control concerning the operation determining means 54, with reference to FIGS. 5 to 8. FIG. 6 is a flowchart showing a critical portion of a main routine of a game program recorded in the storage medium 30, FIG. 7 is a flowchart showing the procedure of a stick operation determining processing sub-routine. FIG. 8 is an illustration of a determination executed as to whether the state of tilt of the right stick 22SR has been changed.

The main routine shown in FIG. 6 is started when the power supply is turned on, so that initializing processing is executed such as clearing the contents of the RAM, and so forth (Step ST210), and a variable "q" is set to 0 (Step ST220). Then, a value 48 is set as the aforesaid insensitive length "A" for the tilting of the right stick 22SR (Step ST230).

Figure 5:
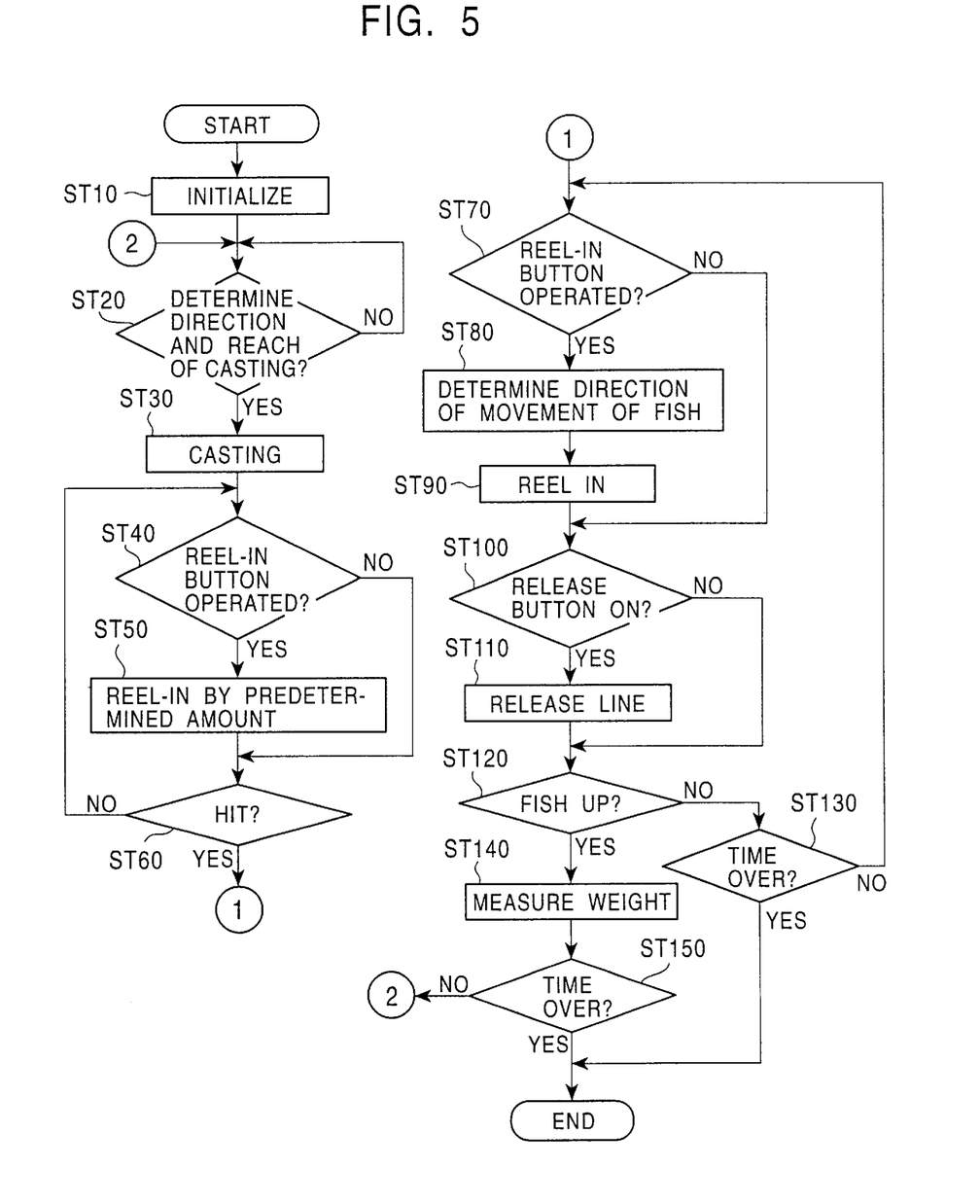
FIG. 5 is a flowchart showing the procedure of a lure fishing game.

Then, a main processing as shown in FIG. 5 is executed (Step ST240). For every 1/60 second (answer "YES" in step ST250), the stick operation determining processing sub-routine is executed (Step ST260).

Referring to FIG. 7, a variable "p" is reset to 0 (Step ST300), and the position information (x, y) of the right stick 22SR is picked up (Step ST310). The value of the variable "p" is then determined in accordance with the position information (x, y).

More specifically, a determination is made as to whether a condition $x>(128+A)$ is met (Step ST320). If the condition $x>(128+A)$ is met (answer "YES" in Step ST320), the variable "p" is incremented by "1" (Step ST330).

Then, a determination is made as to whether a condition $x<(128-A)$ is met (Step ST340). If the condition $x<(128-A)$ is met(answer "YES" in Step ST340), the variable "p" is further incremented by "2" (Step ST350).

Then, a determination is made as to whether a condition $y>(128+A)$ is met (Step ST360). If the condition $y>(128+A)$ is met(answer "YES" in Step ST360), the variable "p" is further incremented by "4" (Step ST370).

Then, a determination is made as to whether a condition $y<(128-A)$ is met (Step ST380). If the condition $y<(128-A)$ is met(answer "YES" in Step ST380), the variable "p" is further incremented by "8" (Step ST390).

As a result of execution of Steps ST320 to ST390, the value of the variable "p" is set in accordance with the coordinates (x, y), as shown in FIG. 8.

More specifically, the value of the variable "p" is set as follows:

On conditions of:

(128−A) x (128+A) and (128−A) y (128+A), i.e., when the coordinates fall in the neutral zone NZ, p=0;

On conditions of:

$x>(128+A)$ and (128−A) y (128+A), i.e., when the coordinates fall in the fifth sub-zone, p=1;

On conditions of:

$x<(128-A)$ and (128−A) y (128+A), i.e., when the coordinates fall in the first sub-zone Z1, p=2;

On conditions of:

(128−A) x (128+A) and $y>(128+A)$, i.e., when the coordinates fall in the seventh sub-zone Z7, p=4;

On conditions of:
  (128−A) x (128+A) and
  y<(128−A),
  i.e., when the coordinates fall in the third sub-zone. Z3,
  p=8;
On conditions of:
  x>(128+A) and
  y>(128+A),
  i.e., when the coordinates fall in the sixth sub-zone Z6,
  p=5;
On conditions of:
  x>(128+A) and
  y<(128−A),
  i.e., when the coordinates fall in the fourth sub-zone Z4,
  p=9;
On conditions of:
  x<(128−A) and
  y>(128+A),
  i.e., when the coordinates fall in the eighth sub-zone Z8,
  p=10; and
On conditions of:
  x<(128−A) and
  y<(128−A),
  i.e., when the coordinates fall in the second sub-zone Z2,
  p=10.

Then, a determination is made as to whether the condition p=0 is met (Step ST400). If the condition p=0 is met (answer "YES" in Step ST400), it is determined that the right stick 22SR is in the neutral zone NZ and, hence, no tilting operation has been made on the right stick 22SR, thus finishing this sub-routine. However, if the condition is p≠0 (answer NO is given in Step ST400), a determination is made as to whether a condition p=q is met (Step ST410).

If the condition p=q is met (answer "YES" in Step ST410), it is determined that the right stick 22SR is within the same sub-zone as that in the preceding determining cycle and, hence, that no change has been effected on the tilt of the right stick 22SR, thus terminating this sub-routine.

Conversely, if the condition is p≠q (ANSWER "no" IN Step ST410), it is determined that the right stick 22SR is within a sub-zone different from that in the preceding determining cycle and, hence, that a change has been effected on the tilt of the right stick 22SR. In this case, for example, a flag is set up to indicate that the take-up button has been operated once, and this information is stored in the main memory 5 (Step ST420). Then, the value of the variable "q" is updated in conformity with the value of the variable "p" (Step ST430), and then the sub-routine is finished.

As a result of the execution of the sub-routine described above, a comparison is made for every 1/60 second between the variable "q" indicative of the sub-zone in which the position (x, y) of the right stick 22SR fell in the last determination cycle and the variable "p" indicative of the sub-zone in which the position (x, y) of the right stick 22SR fell in the instant determination cycle, thereby determining whether a tilting operation has been effected on the right stick 22SR. A change in the state of the tilt is regarded as being a single operation on the take-up button.

Step ST400 in the flowchart shown in FIG. 7 may be omitted. In such a case, a change of the stick position to the neutral zone from any of the first to eighth sub-zones Z1 to Z8 also is regarded as being a change in the tilting state.

As will be understood from the foregoing description, in the illustrated embodiment of the present invention, the fishing line 34 is taken up each time a change occurs in the state of operation on the take-up button, so that the amount of take-up is determined by an adequate or inadequate operation performed by the game player, whereby a greater fun of the game is presented.

When the fourth button 22f is used as the take-up button, the speed of take-up of the fishing line 34 corresponds to the frequency of striking on the fourth button 22f. Thus, the amount of take-up is determined by an adequate or inadequate operation performed by the game player, whereby a greater fun of the game is presented.

When the arrangement is such that the right stick 22SR also functions as the take-up button and such that the fishing line 34 is taken up by a predetermined amount upon each change of the state of the tilt, the speed of take-up of the fishing line 34 corresponds to the quickness of the change in the state f tilt of the right stick 22SR. Thus, the amount of take-up is intentionally controlled by varying the quickness of operation performed by the game player, whereby a greater fun of the game is presented.

Referring to FIG. 8, the right stick 22SR may be rotated such as the first sub-zone Z1→the second sub-zone Z2→the third sub-zone Z3→the fourth sub-zone Z4→the fifth sub-zone Z5→the sixth sub-zone Z6→the seventh sub-zone Z7→the eighth sub-zone Z8→the first sub-zone Z1. Such a rotational operation resembles actual reeling operation for taking up a fishing line, so that the reality of the game is enhanced.

The described embodiment is only illustrative and may be changed and modified as follows.

(1) In the embodiment described heretofore, a simulated action for taking up a fishing line is shown as the action for taking up a string, by way of example. This, however, is not exclusive and the action for taking up a string may be a simulated action for taking up a measuring tape or for drawing in a kite.

(2) Although a lake is specifically mentioned as the fishing site, this is only illustrative and the fishing site may be a river, sea, or the like.

(3) In the described embodiment, the direction of tilt of the right stick 22SR is divided into eight sub-zones Z1 to Z8, in order to enable determination as to whether a change has occurred in the state of tilt. The number of the subzones, however, may be varied, e.g., seven or less or nine or more.

(4) In the illustrated embodiment, the right stick 22SR is constructed as a stick-type controller that can be rotated in all directions. This also is nothing more than an example, and the right stick 22SR may be constructed so as to be tiltable in a plurality of directions from the neutral upright position. In this case, the operation determining means 54 may determine whether a change has occurred in the tilting direction.

(5) The arrangement may be such that the speed of take-up of the fishing line 34 is varied in accordance with the angle of upward tilt of the right stick 22SR. For instance, the arrangement may be such that the take-up speed is set to be low, medium and high, respectively, when the right stick 22SR is tilted to the first sub-zone Z1, second sub-zone Z2 and the third sub-zone Z3 which are shown in FIG. 8.

(6) The controller 22 may be of the type which has a first to fourth on-off switches that are turned on when the right stick is tilted upward, downward, leftward and rightward, respectively.

When such a type of controller 22 is used, the first on-off switch is turned on when the right stick 22SR is tilted upward, while tilting of the right stick 22SR in a right upward direction causes both the first and fourth on-off switches to turn on. Likewise, the fourth on-off switch is turned on when the right stick 22SR is tilted to the right, while tilting of the right stick 22SR in a right downward direction causes both the second and fourth on-off switches to turn on. Similarly, the second on-off switch is turned on when the right stick 22SR is tilted downward, while tilting of the right stick 22SR in a left downward direction causes both the second and third on-off switches to turn on. The third on-off switch is turned on when the right stick 22SR is tilted to the left, while tilting of the right stick 22SR in a left upward direction causes both the first and third on-off switches to turn on.

With this arrangement, it is possible to discriminate eight sub-zones by means of the combinations of the on-off switches which are turned on and off in accordance with the direction of tilt of the right stick 22SR.

(7) In the described embodiment, the cumulative processing to add a predetermined amount of take-up of the fishing line 34 is performed each time the fourth button 22f as the take-up button is turned on. This, however, is not exclusive and the cumulative processing may be performed each time the fourth button 22f is turned off, or in response both to each turning on and turning off of the same button.

As will be understood from the foregoing description, the present invention offers the following advantages.

In accordance with the video game apparatus, as well as the method and storage medium, of the present invention, a determination is made as to whether the state of operation of the operating means has been changed by an externally-effected operation, and a cumulative operation is performed to add a predetermined amount of take-up of the string each time the state of operation is changed. Therefore, shorter time interval of the change in the state of operation of the operating means correspondingly increases the speed of take-up of the string. Thus, speed of take-up is changed in accordance with the rate of operation on the operating means, thus offering a greater fun of the game.

In a specific form of the present invention, the operating means includes an operating stick which can be tilted in a plurality of directions from the upright neutral position. A determination is made as to whether the state of tilt has been changed by an externally-effected operation, and the cumulative processing to add a predetermined amount of take-up is performed each time a change in the state of the tilt is detected. Therefore, the speed of take-up can intentionally be controlled by varying the rate of the tilting operation effected on the operating stick, whereby the fun of the game is enhanced.

In another specific form of the invention, n operating stick which can be tilted rotationally in all directions is used as the operating means. A determination is made as to whether the direction of tilt of the operating stick has-been changed by an externally-effected operation, and a cumulative operation is performed to add a predetermined amount of take-up of the string in response to each predetermined change in the tilting direction. Therefore, the speed of take-up is intentionally controlled in accordance with the speed of the rotational operation of the operating stick, thus offering a greater fun of the game. In addition, the reality of the game can be enhanced, since the action for rotational operation of the operating stick resembles an actual action for taking up a string.

In a different form of the invention which uses also an externally-operable on-off switch as the operating means, a determination is made as to whether the state of the on-off switch has been changed by an externally-effected operation, and a cumulative operation is performed to add a predetermined amount of take-up of the string upon each predetermined change in the state of the on-off switch. Therefore, the speed of take-up is intentionally-controlled in accordance with the frequency of striking on the on-off switch, thus offering a greater fun of the game.

In a still different form of the invention, a determination is made as to whether the direction of tilt of the operating stick has been changed by an externally-effected operation, and a cumulative operation is performed to add a predetermined amount of take-up of the string in response to each predetermined amount of change in the tilting direction. Therefore, the speed of take-up is intentionally controlled in accordance with the speed of the rotational operation of the operating stick, thus offering a greater fun of the game. In addition, the reality of the game can be enhanced, since the action for rotational operation of the operating stick resembles an actual action for taking up a string. The game player can use either the on-of switch or the stick-type controller as the operating means, and the cumulative processing for adding a predetermined amount of take up is performed equally regardless of which one of these controlling means is used. Thus, the game player is allowed to select favorite operating means, thus enhancing the variety of the game.

In a yet different form of the video game apparatus of the invention, the game display screen displays a simulated fishing site on which a character performs fishing by using a fishing line which is the string, and a processing which simulates a state in which a fish has been hooked on the fishing line is performed, and a determination is made as to whether the fish has been hooked on the fishing line. The cumulative processing for adding a predetermined amount of take-up of the string is performed each time the state of operation of the operating means is changed, while the fish has been-hooked on the fishing line. It is determined that the fish has been fished up when the result of the cumulating processing under the hook-on state has reached a predetermined value. Therefore, the speed of take-up of the fishing line is intentionally controlled by the rate of operation of the operating means, whereby the fishing game can be adequately implemented.

In a yet different form of the invention, the direction of movement of the fish hooked on the fishing line is controlled, and the predetermined amount of take-up is changed in accordance with the direction of movement of the fish. Consequently, the speed of take-up of the fishing line varies in accordance with the direction of movement of the fish, whereby the dynamic feel of pulling on the fishing line by the fish can be expressed.

Although the invention has been described through its preferred forms, it is to be understood that the described embodiments are only illustrative and various changes and modifications may be imparted thereto without departing from the scope of the invention which is limited solely by the appended claims.

What is claimed is:

1. A video game apparatus in which a character and a string are simulated and displayed on a game display screen, and an instruction is given to cause said character to perform an action to take-up the string, said video game apparatus comprising:

operating mechanism coupled to said video game apparatus, including an operation mechanism, said operation mechanism being inclinable by an external force applied thereto so as to output an operation signal corresponding to a state of operation;

operation determining means for determining whether an inclination state of operation of said operation mechanism is changed;

take-up amount computing means for performing, each time the inclination state of said operation mechanism is changed, a cumulative processing to add a predetermined amount of take-up of said string; and an on-off switch, in said operating mechanism, that turns on when pressed from a neutral position by an external pressing force and returns to the neutral position so as to turn off when relieved from the pressing force, wherein said operation determining means determines whether the state of said on-off switch is changed, whereby said take-up amount computing means performs the cumulative processing each time the state of said on-off switch is changed.

2. A video game apparatus according to claim 1, wherein:

said operation mechanism is a stick-type controller which has an operating stick tiltable in all directions and operable to output information concerning a state of tilt of said operating stick, said information serving as said operation signal, said operation determining means determines also whether a direction of tilt of said operating stick is changed, and said take-up amount computing means regards a predetermined change in the direction of tilt as a change in the state of said on-off switch, so as to perform said cumulative processing also in response to each predetermined change in the direction of tilt.

3. A video game apparatus in which a character and a string are simulated and displayed on a game display screen, and an instruction is given to cause said character to perform an action to take-up the string, said video game apparatus comprising:

an operating mechanism including:
an ON-OFF switch that turns on when pressed from a neutral position by an external force and turns off to return to the neutral position when application of the external force is released; and
an operation stick that is tiltable in all directions and outputs an operation signal indicating a state of tilt of the operation stick so as to output an operation signal;

operation determining means for determining whether a state of said ON-OFF switch is changed and for determining whether the direction of tilt of the operation stick is changed; and take-up amount computing means for performing, each time the state of one of the ON-OFF switch and the tilting direction of the operation stick is changed, a cumulative processing to add a predetermined take up amount of said string.

4. A video game apparatus according to claim 3, further comprising:

game procedure controlling means causing the game display screen to display a simulated fishing site and causing said character to perform fishing by using said string as a fishing line, said game procedure controlling means including:
fish hook-on processing means for performing a processing which simulates a state in which a fish is hooked on said fishing line;
hook-on determining means for determining whether said fish is hooked on said fishing line; and
a fish landing determining means which determines that the fish is landed when the result of said cumulating processing under the hook-on state has reached a predetermined value.

5. A video game apparatus according to claim 4, wherein said game procedure controlling means includes a fish controlling means for controlling the direction of movement of the fish hooked on the fishing line, and said take-up amount computing means changes the predetermined take-up amount in accordance with the direction of movement of said fish.

6. A method of computing amount of take-up of a string in a video game in which a character and the string are simulated and displayed on a game display screen, and an instruction is given to said character to cause said character to perform an action to take-up said string, said method comprising:

determining whether a state of operation on an operation mechanism, which is externally inclinable, is changed based on an operation signal produced in accordance with a state of the inclination, and whether a state of an ON-OFF switch is changed; and performing a cumulative processing to add a predetermined take-up amount of said string upon each change of the state of inclination and the state of the ON-OFF switch.

* * * * *